(12) United States Patent
Karlberg et al.

(10) Patent No.: US 11,847,145 B2
(45) Date of Patent: Dec. 19, 2023

(54) ALIASED DATA RETRIEVAL FOR KEY-VALUE STORES

(71) Applicant: Microsoft Technology Licensing, LLC, Redmond, WA (US)

(72) Inventors: Jan-Ove Almli Karlberg, Tromsø (NO); Andrei-Alin Corodescu, Oslo (NO); Helge Grenager Solheim, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/051,083

(22) Filed: Oct. 31, 2022

(65) Prior Publication Data

US 2023/0079753 A1 Mar. 16, 2023

Related U.S. Application Data

(63) Continuation of application No. 17/158,101, filed on Jan. 26, 2021, now Pat. No. 11,514,088.

(51) Int. Cl.
*G06F 16/28* (2019.01)
*G06F 16/2457* (2019.01)
*G06F 16/22* (2019.01)
*G06F 16/248* (2019.01)

(52) U.S. Cl.
CPC ........ *G06F 16/288* (2019.01); *G06F 16/2282* (2019.01); *G06F 16/248* (2019.01); *G06F 16/24573* (2019.01)

(58) Field of Classification Search
None
See application file for complete search history.

(56) References Cited

U.S. PATENT DOCUMENTS

| | | | | |
|---|---|---|---|---|
| 11,226,959 B2* | 1/2022 | Korpman | ................ | G06F 16/81 |
| 11,281,662 B2* | 3/2022 | Korpman | ............ | G06F 16/8373 |
| 11,301,461 B2* | 4/2022 | Korpman | ............ | G06F 16/9577 |
| 11,522,967 B2* | 12/2022 | Vihar | ...................... | G06F 9/547 |
| 11,586,613 B2* | 2/2023 | Korpman | ................ | G06F 40/30 |
| 11,593,353 B2* | 2/2023 | Korpman | ............ | G06F 16/367 |
| 11,620,278 B2* | 4/2023 | Korpman | ............ | G06F 16/9027 |
| | | | | 707/741 |
| 2020/0341963 A1* | 10/2020 | Kreutzer | ............ | G06F 16/2358 |
| 2021/0110278 A1* | 4/2021 | Meyerzon | ............. | G06N 20/00 |
| 2021/0288971 A1* | 9/2021 | Karlberg | ............... | H04L 63/105 |
| 2021/0377275 A1* | 12/2021 | Grønvik | ................ | H04L 63/102 |
| 2022/0237213 A1* | 7/2022 | Karlberg | ............... | G06F 16/215 |

* cited by examiner

*Primary Examiner* — Kim T Nguyen (57) ABSTRACT

Examples of the present disclosure describe systems and methods for aliased data insertions/retrieval for key-value stores. In aspects, a data set comprising a primary key, one or more secondary keys ("aliases"), and data values may be received by a data storage system. The system may allocate an internal identifier to the primary key and store the internal identifier and the primary key in a first table. Each of the secondary keys may be used to create a key-value pair comprising the secondary key and the internal identifier. The key-value pair(s) may be stored in the first table with the corresponding primary key. The internal identifier and the data values may be stored in a second table. Subsequently, the primary or secondary key may be used to interrogate the first table for the internal identifier. The internal identifier may then be used to interrogate the second table for the data values.

20 Claims, 9 Drawing Sheets

ALIASED DATA RETRIEVAL FOR KEY-VALUE STORES

CROSS-REFERENCE TO RELATED APPLICATIONS

This application is a continuation of U.S. patent application Ser. No. 17/158,101 filed on Jan. 26, 2021, entitled "Aliased Data Retrieval for Key-Values Stores," which is incorporated herein by reference in its entirety.

BACKGROUND

Key-value stores are used for storing data in distributed software systems. In key-value stores, each value in a key-value pair is associated with a key. The key is used to retrieve the value from the key-value store. In many cases, multiple services consume the same underlying data set (e.g., the values in the key-value pair). However, each of the services may use a different key (and, therefore, key-value pair) to access the data set. These different key-value pairs result in data duplication and increase the overall processing, latency, and data storage costs of data retrieval in systems that utilize key-value stores.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for aliased data insertion/retrieval for key-value stores. In aspects, a data set comprising a primary key, one or more secondary keys (or aliases), and one or more data values may be received by a data storage system or service. The primary key may be allocated an identifier that is internally assigned by the data storage system or service ("internal identifier"). The primary key and the internal identifier may be stored in a first table of the data storage system or service. Each of the secondary keys may be used to create a new key-value pair comprising the secondary key (the key) and the internal identifier (the value). The key-value pair may be stored in the first table with the corresponding primary key. The internal identifier and the one or more data values may be stored to a second table of the data storage system or service. Subsequently, the primary or a secondary key may be used to interrogate the first table for the internal identifier. The internal identifier may then be used to interrogate the second table for the one or more data values.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

A key-value store (or key-value database) is a data storage paradigm for storing, retrieving, and managing associative arrays of key-value pairs. In conventional key-value store implementations, a key-value pair is stored in a table (or similar data storage structure) having only two columns: a key column and a value column. The "key" portion of the key-value pair is associated with a specific application or service and the "value" portion of the key-value pair corresponds to an underlying data set. As the key-value pair is stored such that the key portion is a unique identifier for the value portion, the key portion is used to interrogate the key-value store for the value portion. In many instances, the underlying data corresponding to the value portion may be accessed or used by multiple applications and/or services. In such instances, each application/service may be assigned a different key for accessing the underlying data. Accordingly, the key-value store may store a different key-value pair for each application/service. Moreover, the various applications/services often do not have access to the same single key-value store. As a result, key-value pairs are duplicated or generated anew across multiple key-value stores, which requires the applications/services to access multiple key-value stores. This duplication of (at least) the value portion results in an increase of the processing requirements, data request latency, and data storage costs of these conventional key-value stores.

To address the challenges with conventional key-value store implementations, the present disclosure describes systems and methods for aliased data retrieval. In aspects, one or more data sets comprising a primary key, one or more secondary keys, and one or more data values may be received by a data storage system or service. A primary key, as used herein, may refer to an identifier of a resource (e.g., an application, a service, a document, a file, or a feature thereof), a data object (e.g., window, control element, data structure), or an entity (e.g., user, organization, group). A secondary key, as used herein, may refer to an alias or an identifier of an alternate designation associated with a primary key or an application, service, etc. associated with the primary key. Upon receiving the data set, one or more search techniques may be used to identify and/or extract the primary key, secondary key(s), and/or data value(s). The primary key may be allocated an identifier that is internally assigned by the data storage system or service ("internal identifier"). The primary key and the assigned internal identifier may be stored in a first data storage structure of the data storage system or service such that that primary key may be used to interrogate the first data storage structure for the internal identifier. Examples of the first data storage structure may include databases (e.g., relational databases, graph databases), data tables, markup language files, flat files, and the like.

The secondary key(s) may be deserialized to create a list of secondary keys. For example, each secondary key in a delimited list of secondary keys may be extracted from the delimited list and listed as a separate entry or row. Each of the secondary keys may be used to create a new key-value pair where the secondary key is the key portion of the key-value pair and the internal identifier is the value portion of the key-value pair. The key-value pair may be stored in the first data storage structure with the corresponding primary key such that the secondary key may be used to interrogate the first data storage structure for the internal identifier. The internal identifier and the data value(s) in the data set may be stored to a second data storage structure of the data storage system or service such that the internal identifier may be used to interrogate the second data storage structure for the data value(s).

In aspects, after the data set has been stored to the first and second data storage structures, a request to access a data value in the previously received data set may be received. The request may comprise a primary key or a secondary key. The primary or secondary key may be used to interrogate the first data storage structure for the internal identifier. The internal identifier may then be used to interrogate the second data storage structure for the data value. Accordingly, the methods of the present disclosure improve upon conventional key-value store implementations that use a single data storage structure by abstracting the key-value store into at least two parts (e.g., a first data storage structure and a second data storage structure). This abstraction enables data values to be retrieved using primary and secondary keys that are provided to a single data storage system or service.

Accordingly, the present disclosure provides a plurality of technical benefits including but not limited to: enabling key-value pair storage and retrieval using aliased keys, decreasing data duplication of key-value pair entries, improving data retrieval speed, reducing data storage requirements and data processing costs, centralizing key-value pairs and key aliases in a single data store, enabling heterogenous applications/services to access a common underlying data set from a single key-value store or data store, among other examples.

Figure 1:
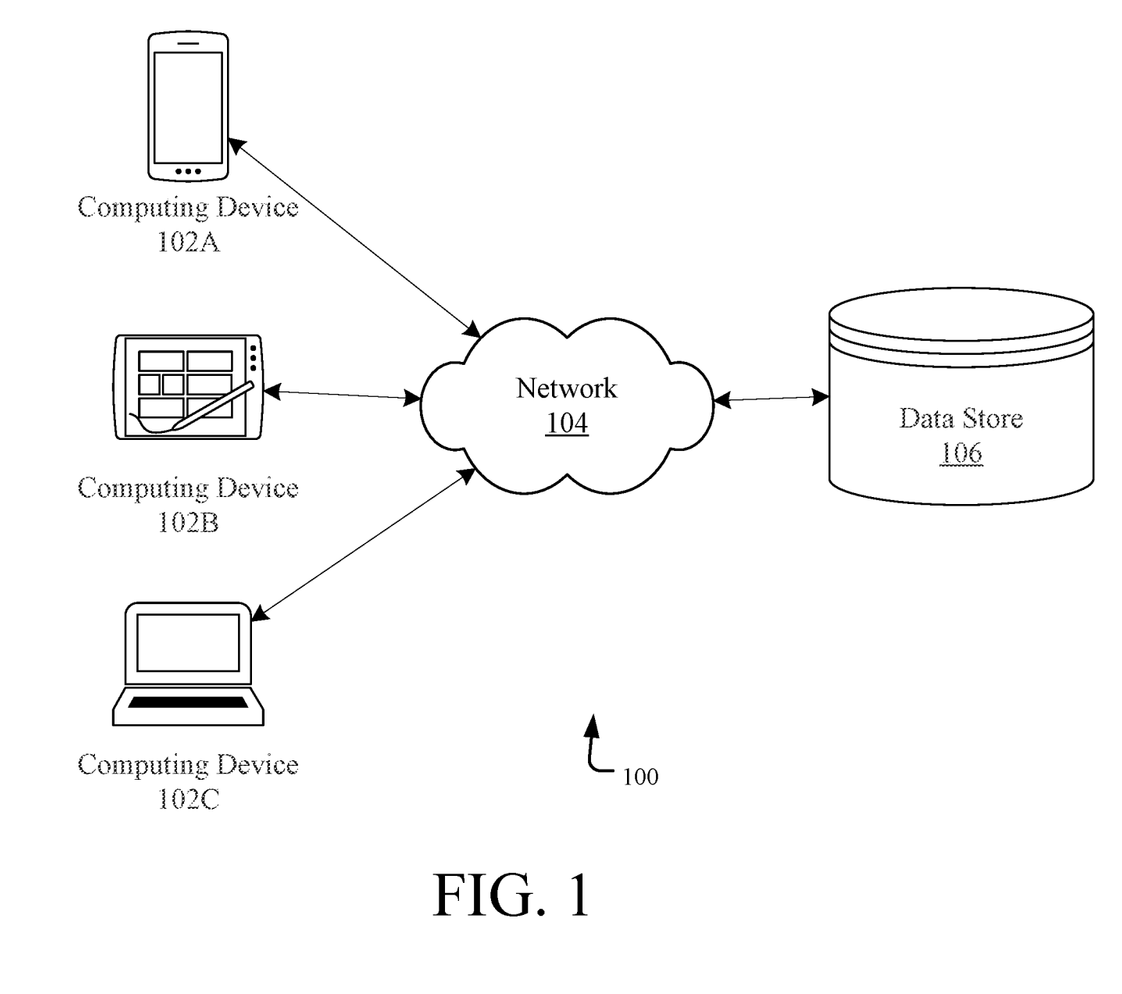
FIG. 1 illustrates an overview of an example system for aliased data insertion/retrieval.

FIG. 1 illustrates an overview of an example system for aliased data insertion/retrieval. Example system 100 as presented is a combination of interdependent components that interact to form an integrated whole. Components of the system may be hardware components or software components implemented on and/or executed by hardware components of the system. In one example, system 100 may provide an operating environment for software components to execute and utilize resources or facilities of system 100. An example of one or more processing devices comprising such an operating environment is depicted in FIGS. 5-8. In another example, the components of systems disclosed herein may be distributed across multiple devices. For instance, input may be entered on a client device and information may be processed on or accessed from other devices in a network, such as one or more remote cloud or web server devices.

In FIG. 1, system 100 comprises computing devices 102A, 102B, and 102C (collectively "computing devices 102"), network 104, and data store 106. One of skill in the art will appreciate that the scale of systems such as system 100 may vary and may include additional or fewer components than those described in FIG. 1. For instance, in some examples, computing devices 102 may comprise data store 106 or one or more features implemented by data store 106.

Computing devices 102 may be configured to receive or collect input from one or more users or data sources. Examples of computing devices 102 include, but are not limited to, personal computers (PCs), server devices, mobile devices (e.g., smartphones, tablets, laptops, personal digital assistants (PDAs)), and wearable devices (e.g., smart watches, smart eyewear, fitness trackers, smart clothing, body-mounted devices). Computing devices 102 may provide one or more sensors and/or input modalities for receiving or collecting input. Example sensors and/or input modalities include microphones, touch-based sensors, keyboards, pointing/selection tools, optical/magnetic scanners, accelerometers, magnetometers, gyroscopes, etc. The collected input may include, for example, voice input, touch input, text-based input, gesture input, video input, and/or image input. Computing devices 102 may also provide one or more applications and/or services that enable the collected input (or portions thereof) to be provided to a data storage solution, such as data store 106. In some examples, the data storage solution may be implemented locally on computing devices 102. In other examples, computing devices 102 may access the data storage solution remotely over a network, such as network 104. Examples of network 104 include, but are not limited to, personal area networks (PANs), local area networks (LANs), metropolitan area networks (MANs), and wide area networks (WANs).

Data store 106 may be configured to store, retrieve, and/or manage data received from data sources, such as computing devices 102. Examples of data store 106 include, but are not limited to, key-value stores, key-value databases, relational databases, graph databases, structured documents, and flat files. In aspects, data store 106 may be configured to store data as a collection of key-value pairs (e.g., an associative array, symbol table, a hash table, a data dictionary) such that each key of a key-value pair appears only once in the data as a key. However, data store 106 is not limited to such aspects, as data store 106 may also be configured to store data in alternate configurations. Data store 106 may comprise or have access to one or more stored procedures, functions, methods, routines, and/or application programming interfaces (APIs) for manipulating received/stored data. For example, data store 106 may comprise a procedure for inserting received data that includes a primary key one or more secondary keys (or aliases) into a first data storage structure. Data store 106 may also comprise procedures for allocating an internal identifier to the primary and/or secondary key(s) and inserting the internal identifier and one or more data values in the received data into a second data storage structure. Data store 106 may further comprise procedures for retrieving the one or more data values from the second data storage structure when a request comprising the primary key and/or the secondary key is received.

Figure 2:
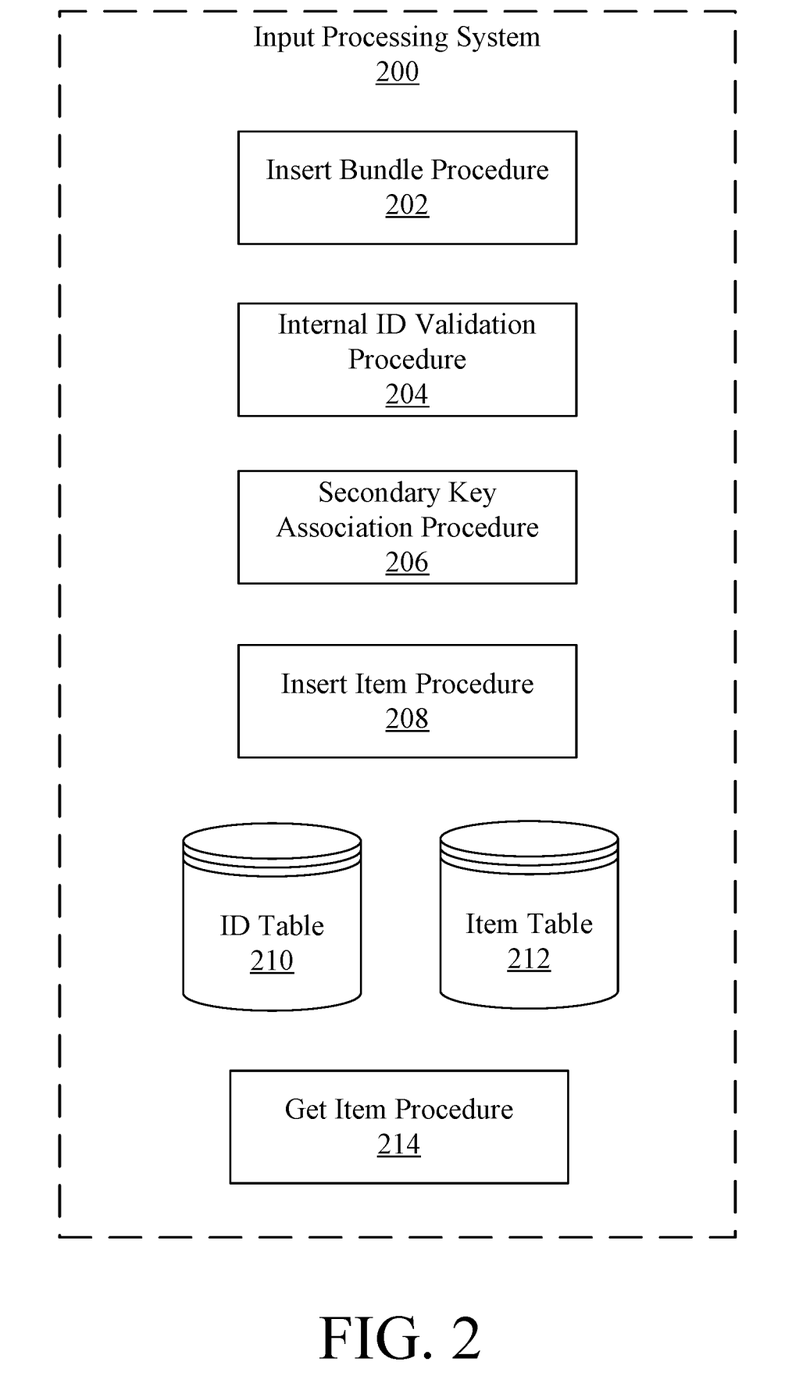
FIG. 2 illustrates an example input processing system for aliased data insertion/retrieval.

FIG. 2 illustrates an example input processing system for aliased data insertion/retrieval. The techniques implemented by input processing system 200 may comprise the techniques and data described in system 100 of FIG. 1. Although examples in FIG. 2 and subsequent figures will be discussed in the context of key-value stores, the examples are equally applicable to other contexts, such relational databases, graph databases, and other data storage solutions. In some examples, one or more data and components described in FIG. 2 (or the functionality thereof) may be distributed across multiple devices. In other examples, a single device may comprise the data and components described in FIG. 2.

In FIG. 2, input processing system 200 may represent a key-value store, a key-value database, or a similar data storage solution. Input processing unit 200 comprises insert bundle procedure 202, internal ID validation procedure 204, secondary key association procedure 206, insert item procedure 208, ID table 210, Item table 212, and get item procedure 214. One of skill in the art will appreciate that the scale of input processing system 200 may vary and may include additional or fewer components than those described in FIG. 2.

Insert bundle procedure 202 may be configured to insert a received data set into one or more data storage structures. Insert bundle procedure 202 may be implemented as, for example, a stored procedure, a function, a method, a routine, etc. In aspects, insert bundle procedure 202 may receive a data set from one or more data sources, such as computing devices 102. The data set may include one or more keys and one or more corresponding data item or values. As a specific example, insert bundle procedure 202 may be configured to accept a data set comprising at least a primary key, one or more secondary keys, and a data item. The primary key may identify or be associated with an application, a service, a feature, a data object, or an entity. The secondary key may identify or be associated with an alias or an alternate designation for or associated with a primary key. The data item may represent or comprise one or more data values. Insert bundle procedure 202 may require a data set to be provided in a predefined format. Alternately, insert bundle procedure 202 may format the received data set using one or more data extraction/analysis tools. For example, insert bundle procedure 202 may identify/extract a primary key, secondary keys, and a data item in a received data set using regular expressions, fuzzy search logic, wildcard search logic, or other pattern matching techniques. The identified/extracted data may then be formatted based on a data storage structure schema or according to a procedure format.

In aspects, insert bundle procedure 202 may provide the primary key to internal ID validation procedure 204. Internal ID validation procedure 204 may be configured to determine whether a primary key is currently associated with an internal identifier of input processing system 200. The internal identifier may be a value that is allocated and used locally by input processing system 200. Internal ID validation procedure 204 may receive the primary key as an argument or parameter. Internal ID validation procedure 204 may use the primary key to query ID table 210. ID table 210 may be a data storage structure comprising at least primary key entries, secondary key entries, and internal identifier entries. In at least one example, ID table 210 may also comprise one or more metadata properties that may be used for data validation or to provide additional information for the data storage structure. For instance, ID table 210 may comprise a column or a property for determining the primary key associated with a secondary key and whether a key is a secondary key. If ID table 210 comprises an internal identifier for the primary key, internal ID validation procedure 204 may identify/return the internal identifier. If ID table 210 does not comprise an internal identifier for the primary key, an internal identifier may be allocated for the primary key. The primary key and the allocated internal identifier may then be inserted into ID table 210 such that the primary key may be used to interrogate ID table 210 for the internal identifier. After the insertion into ID table 210, internal ID validation procedure 204 may identify/return the internal identifier for the primary key.

After identifying an internal identifier for the primary key, the secondary keys may be deserialized into a list of individual secondary keys. For example, a comma delimited list of secondary keys may be separated into a list of individual secondary keys. The individual secondary keys and the internal identifier allocated to the primary key may be provided to secondary key association procedure 206. Secondary key association procedure 206 may be configured to associate one or more secondary keys with an internal identifier. Secondary key association procedure 206 may receive a secondary key and the internal identifier as arguments or parameters. Secondary key association procedure 206 may use the secondary key and the internal identifier to create a new key-value pair where the secondary key is the key portion of the key-value pair and the internal identifier is the value portion of the key-value pair. A key-value pair may be created for each secondary key received with the primary key. The new key-value pair(s) may be inserted into ID table 210 under the corresponding primary key.

Insert item procedure 208 may be configured to store an internal identifier and a corresponding data item. In aspects, insert item procedure 208 may receive the data item in the data set and the internal identifier associated with the primary key and/or secondary key(s) as arguments or parameters. Insert item procedure 208 may insert the internal identifier and the data item into Item table 212 such that the internal identifier may be used to interrogate Item table 212 for the data item. Item table 212 may be a data storage structure comprising at least, internal identifier entries and data item entries. The insertion of the internal identifier and the data item into Item table 212 may complete the insert process initiated by insert bundle procedure 202. Accordingly, a response (e.g., success, failure, error) may be returned to insert bundle procedure 202.

Get item procedure 214 may be configured to retrieve a stored data item. In aspects, a data request to retrieve a stored data item may be received by input processing system 200. The data request may comprise a secondary key and/or a primary key. The secondary or primary key may be identified in and/or extracted from the data request as described above with respect to insert bundle procedure 202. The extracted key(s) may be provided to get item procedure 214. Get item procedure 214 may use the extracted key(s) to query Item table 212 for a key-value pair comprising the extracted key(s). If a key-value pair is found, the corresponding data item (e.g., the value portion of the key-value pair) may be identified/returned by get item procedure 214. The identified/returned data item may then be provided to satisfy the data request.

Having described various systems that may be employed by the aspects disclosed herein, this disclosure will now describe one or more methods that may be performed by various aspects of the disclosure. In aspects, methods 300 and 400 may be executed by a system, such as system 100 of FIG. 1 or input processing system 200. However, methods 300 and 400 are not limited to such examples. In other aspects, methods 300 and 400 may be performed by a single device or component that integrates the functionality of the components of input processing system 200. In at least one aspect, methods 300-400 may be performed by one or more components of a distributed network, such as a web service/distributed network service (e.g. cloud service).

Figure 3:
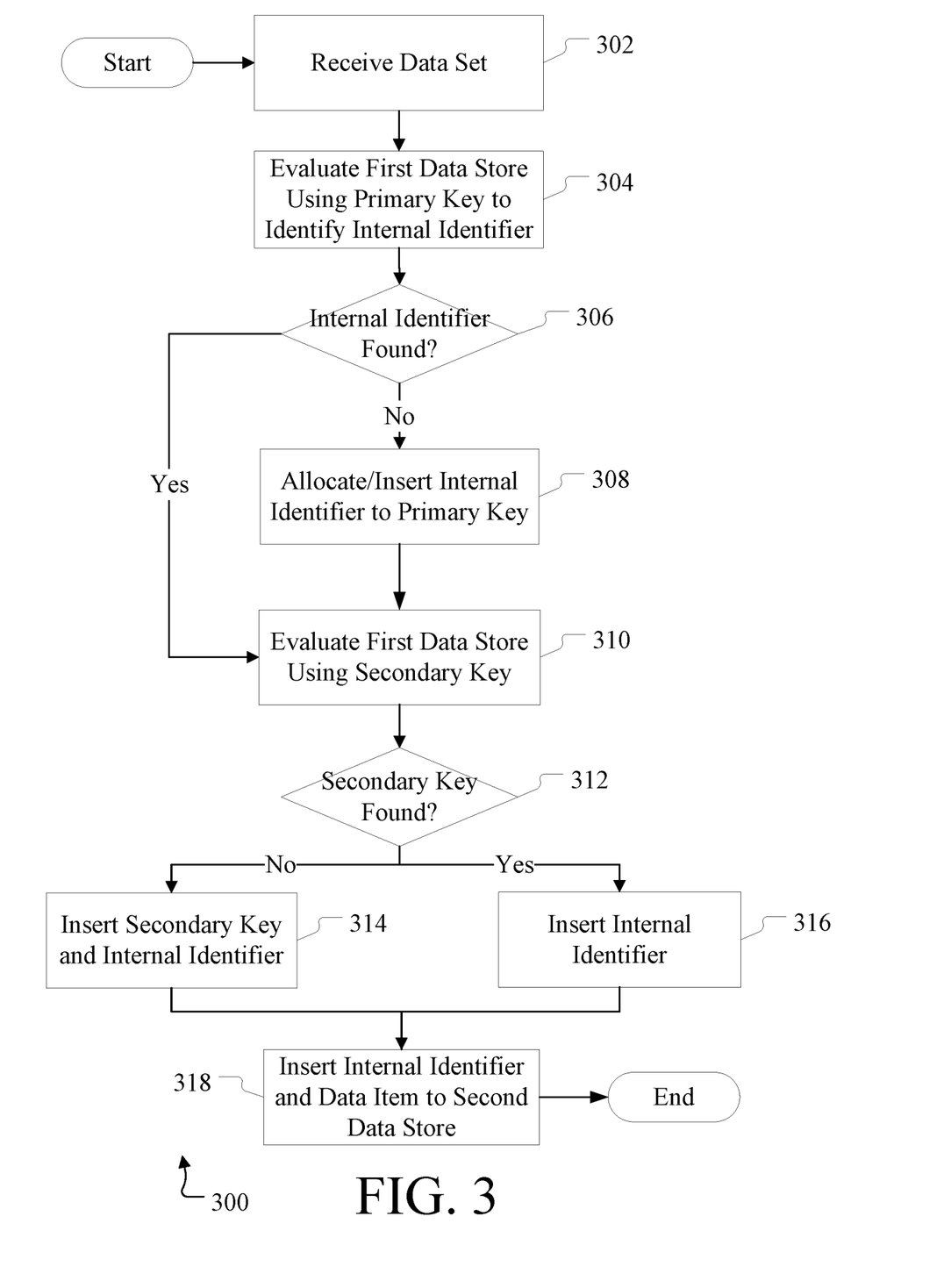
FIG. 3 illustrates an example method for aliased data insertion.

FIG. 3 illustrates an example method for aliased data insertion. Example method 300 begins at operation 302, where a data set is received by a data storage solution, such as input processing system 200. In some aspects, the data set may comprise a primary key, one or more secondary keys, and a data item. For example, a data set may comprise a primary key representing a document identifier, such as document name (e.g., FY2020 Report.doc). The data set may also comprise a secondary key representing an alternate identifier for the document, such as a uniform resource locator (URL), a uniform resource locator (URN), or an identifier that is specific to an application or service. The data set may further comprise a data item representing document content and/or one or more properties associated with the document.

In other aspects, multiple data sets may be received by a data storage solution. For example, a first data set may be received by the data storage solution at a first time or via a first data receipt operation. The first data set may comprise a primary key, a first secondary key, and a data item. Subsequently, a second data set may be received by the data storage solution at a second time or via a second data receipt operation. The second data set may comprise the primary key, a second secondary key, and/or the data item (or portions thereof). For instance, a new service may request access to a data item previously received and stored by the data storage solution. The stored data item may be stored with a primary key and a first secondary key. The request by the new service to access the data item may include a data set comprising the primary key, a second secondary key, and the data item (or an identifier of the data item). The second secondary key may identify or otherwise correspond to the new service.

In at least one example, a first data set and a second data set may be received by the data storage solution at approximately the same time or in close temporal proximity. Upon receipt, the first and second data sets may be evaluated to identify commonalities (e.g., common elements or a stated association) between the first and second data sets. For instance, a commonality may be found when the first and second data sets comprise a common primary key. Upon identifying one or more commonalities, the first and second data sets may be combined into a third data set comprising the data from the first and second data sets. For instance, the third data set may comprise a primary key common to the first and second data sets, each unique secondary key in the first and second data sets, and/or a data item common to the first and second data sets.

In aspects, the received data set (or the newly combined data set) may be provided to or detected by a data set insertion component, such as insert bundle procedure 202. The data set insertion component may identify and/or extract the primary key, secondary key(s), and/or data item in the data set using a pattern matching utility.

At operation 304, the primary key is evaluated to identify an internal identifier. In aspects, the primary key may be provided to a validation component, such as internal ID validation procedure 204. The validation component may use the primary key to query a first data storage structure, such as ID table 210, for a corresponding internal identifier. The first data storage structure may comprise at least one or more primary keys and the corresponding internal identifiers (if any) for the primary keys. At determination operation 306, a determination is made as to whether the first data storage structure comprises an internal identifier corresponding to the primary key. If a corresponding internal identifier is found in the first data storage structure, method 300 proceeds to operation 310. However, if a corresponding internal identifier is not found in the first data storage structure, method 300 proceeds to operation 308.

At operation 308, an internal identifier may be allocated for the primary key by the first data storage structure (or an alternate component of input processing system 200). Upon allocation, the primary key and/or the internal identifier may be inserted into the first data storage structure.

At operation 310, the secondary key is evaluated against the first data storage structure. In aspects, the secondary key may be provided to an association component, such as secondary key association procedure 206. The association component may use the secondary key to query the first data storage structure for the secondary key. At determination operation 312, a determination is made as to whether the first data storage structure comprises the secondary key. If the secondary key is not found in the first data storage structure, method 300 proceeds to operation 314. At operation 314, the secondary key and the internal identifier may be inserted into the first data storage structure under the corresponding primary key. Method 300 may then proceed to decision operation 318.

However, if the secondary key is found in the first data storage structure, method 300 proceeds to operation 316. At operation 316, the internal identifier may be upserted into the first data storage structure under the secondary key. For instance, the internal identifier may be inserted into a row comprising the secondary key and/or the primary key. In such as example, an internal identifier previously associated with the secondary key and stored in first data storage structure may be overwritten by the current internal identifier. An upsert operation, as used herein, may refer to an operation that inserts, for example, rows into a database table if the rows do not already exist or updates the rows if the rows do exist. Alternately, if the secondary key is found in the first data storage structure, the metadata properties of the found secondary key may be evaluated. For instance, a metadata property that indicates the secondary key is actually a secondary key (as opposed to a primary key) may be evaluated. If the metadata properties indicate that the secondary key is a valid value, the internal identifier may be upserted into the first data storage structure under the secondary key. Method 300 may then proceed to decision operation 318. However, if the metadata properties do not indicate that the secondary key is a valid value, any data inserted into the first data storage structure during operations 302-316 may be removed and method 300 ends.

At decision operation 318, the internal identifier and the data item may be inserted into a second data storage structure. In aspects, the internal identifier and the data item in the data set may be provided to a data item insertion component, such as insert item procedure 208. The data item insertion component may upsert the internal identifier and the data item to a second data storage structure, such as Item table 212, such that the internal identifier may be used to interrogate Item table 212 for the data item. The second data storage structure may comprise at least one or more internal identifiers and the corresponding data items (if any) for the internal identifiers.

Figure 4:
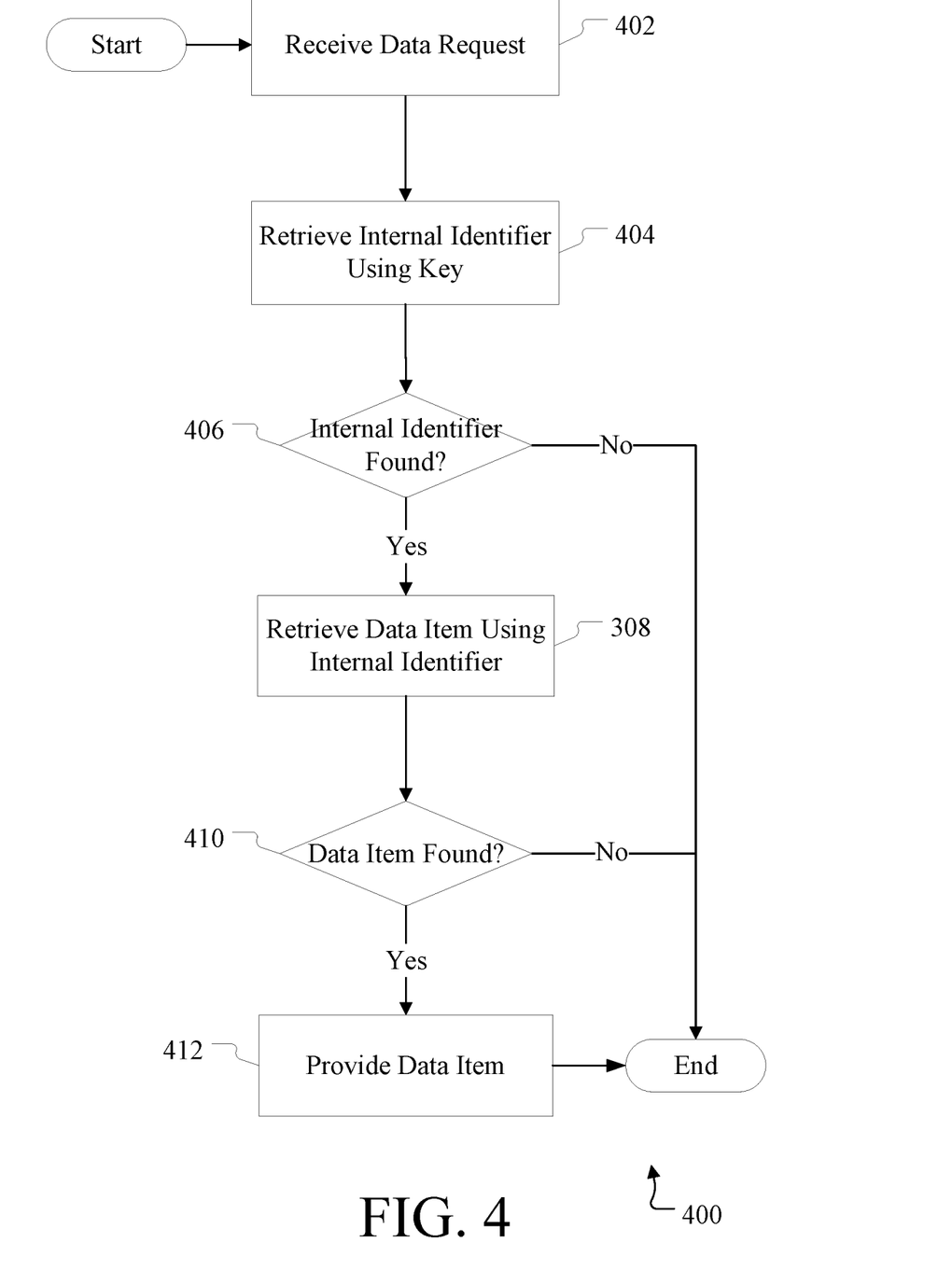
FIG. 4 illustrates an example method for aliased data retrieval.

FIG. 4 illustrates an example method for aliased data retrieval. Example method 400 begins at operation 402, where a data request is received by a data storage solution, such as input processing system 200. The request may comprise a secondary key and/or a primary key. For example, a data request may comprise a secondary key, such as a document URL. The secondary key may be an alias or an alternate identifier for a primary key for a corresponding resource. In aspects, the received data request may be provided to or detected by a validation component, such as internal ID validation procedure 204. The validation component may identify and/or extract a secondary or primary key in the data request using a pattern matching utility.

At operation 404, the secondary or primary key may be used to retrieve an internal identifier. In aspects, the validation component may use the secondary or primary key to query a first data storage structure, such as ID table 210, for a corresponding internal identifier. At determination operation 406, a determination is made as to whether the first data storage structure comprises an internal identifier corresponding to the secondary or primary key. If a corresponding internal identifier is found in the first data storage structure, method 400 proceeds to operation 408. However, if a corresponding internal identifier is not found in the first data storage structure, the data request fails and method 400 ends.

At operation 408, the internal identifier may be used to retrieve a data item. In aspects, the internal identifier may be provided to an item retrieval component, such as get item procedure 214. The item retrieval component may use the internal identifier to query a second data storage structure, such as Item table 212, for a corresponding data item. At determination operation 410, a determination is made as to whether the first data storage structure comprises a data item corresponding to the internal identifier. If a corresponding data item is not found in the second data storage structure, the data request fails and method 400 ends. However, if a corresponding data item is found in the second data storage structure, method 400 proceeds to operation 412. At operation 412, the item retrieval component may provide the data item to satisfy the data request.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
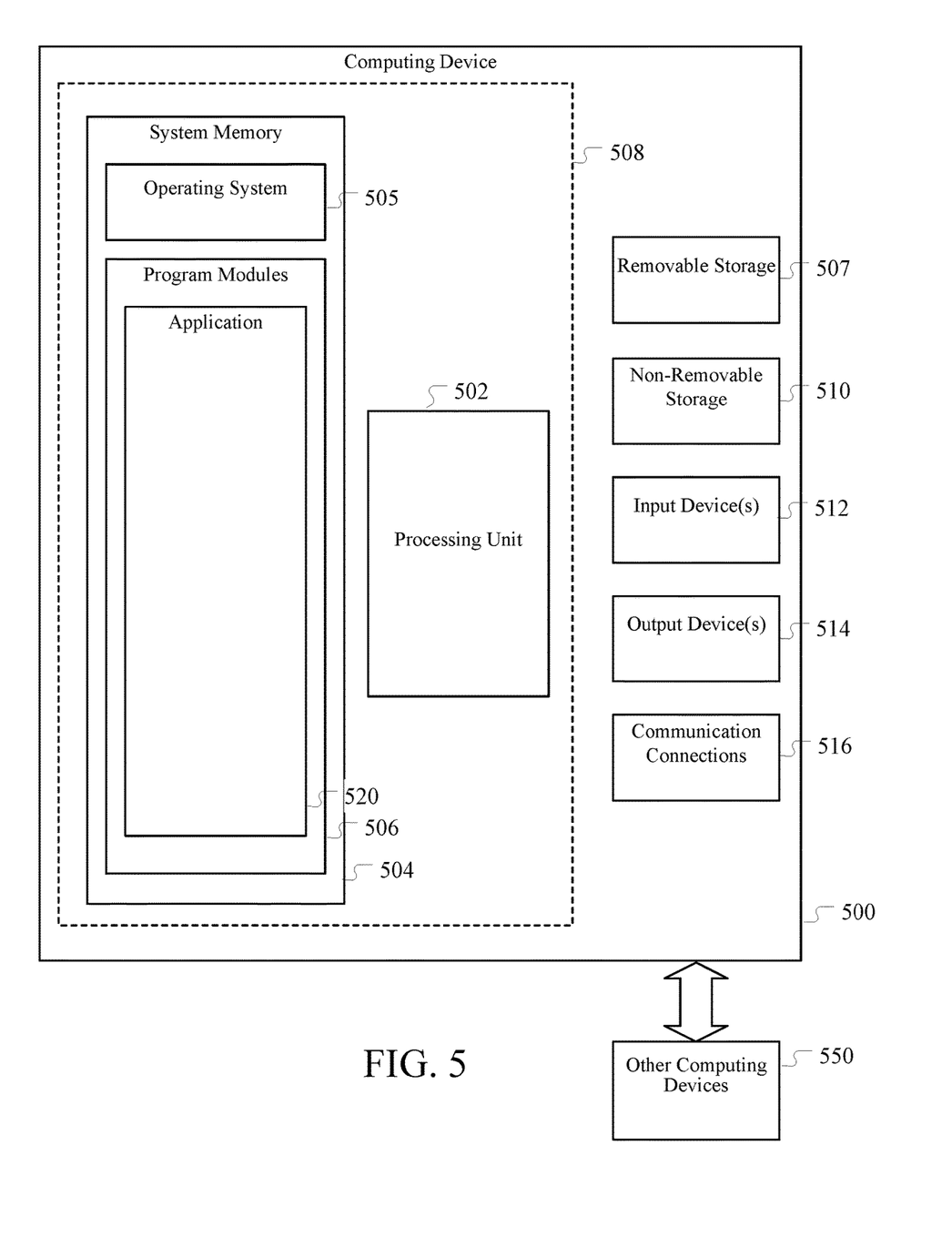
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices and systems described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
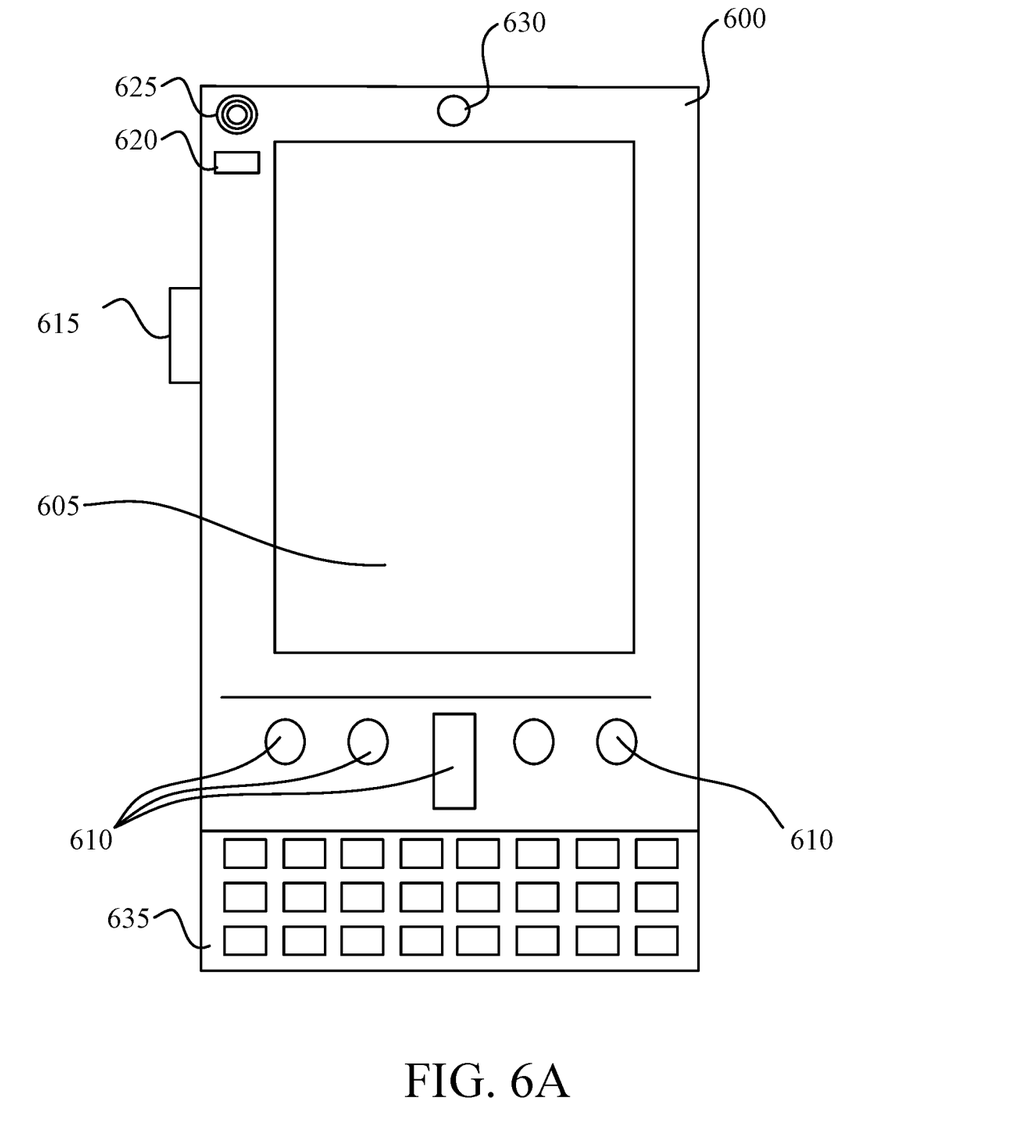
FIGS. 6A and 6B are simplified block diagrams of a mobile computing device with which aspects of the present disclosure may be practiced.
Figure 6B:
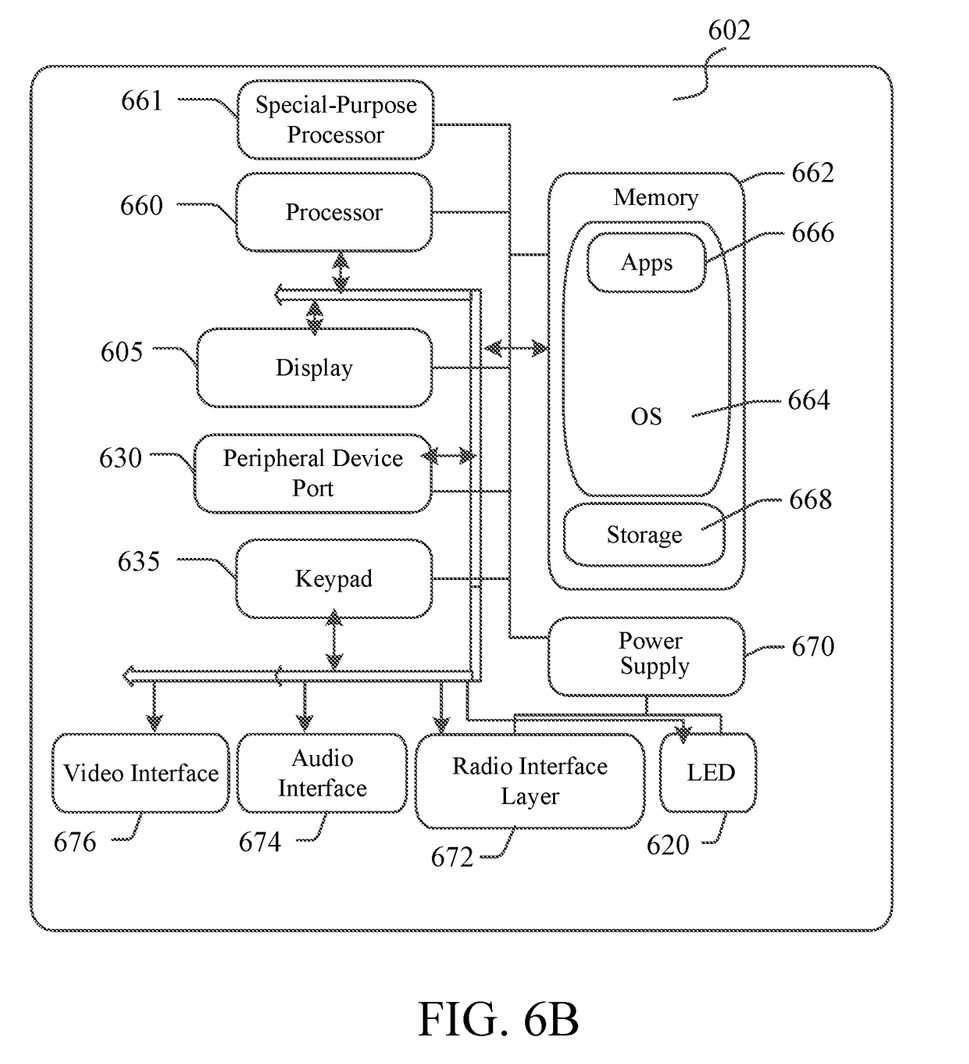

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor(s) (e.g., processor 660 and/or special-purpose processor 661) and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
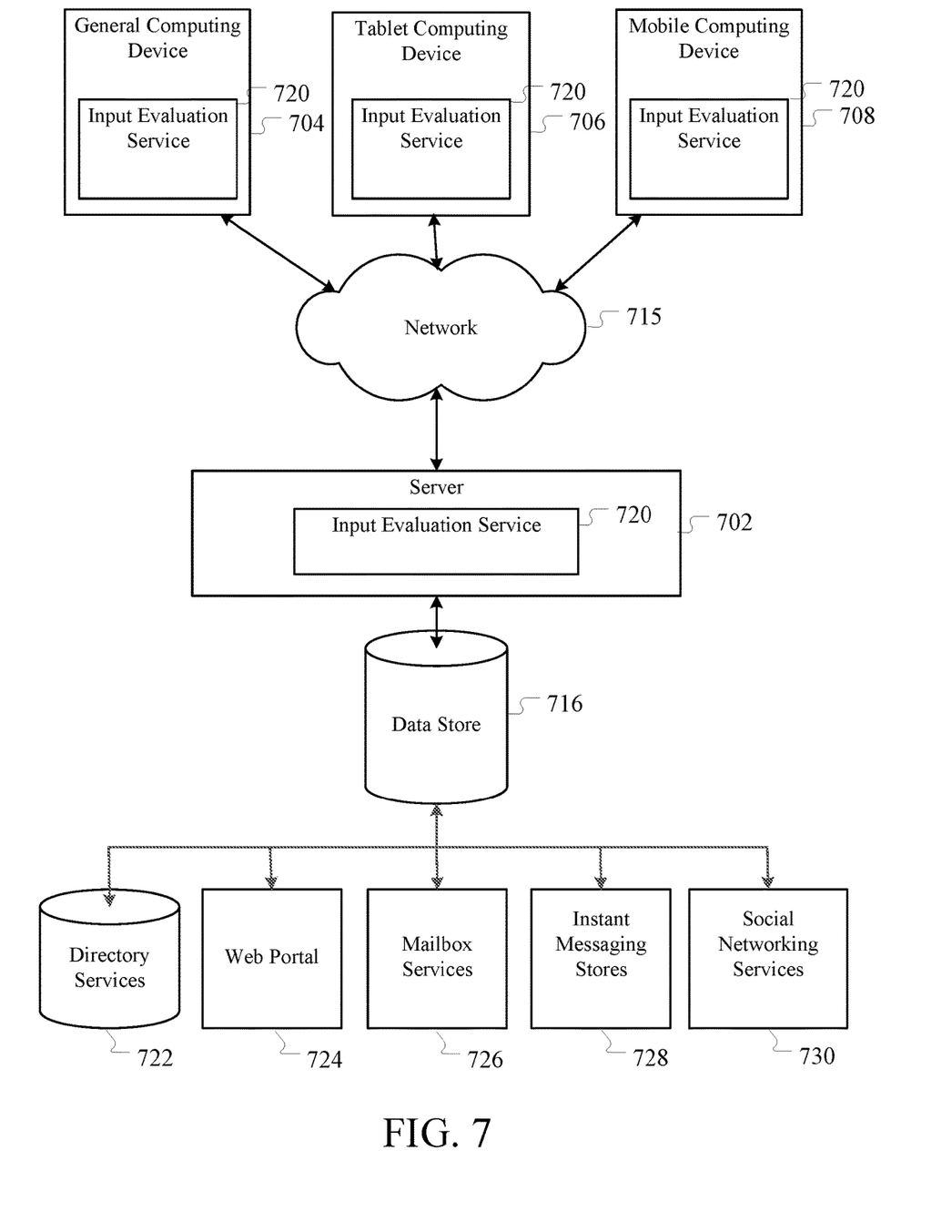
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

An input evaluation service 720 may be employed by a client that communicates with server device 702, and/or input evaluation service 720 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
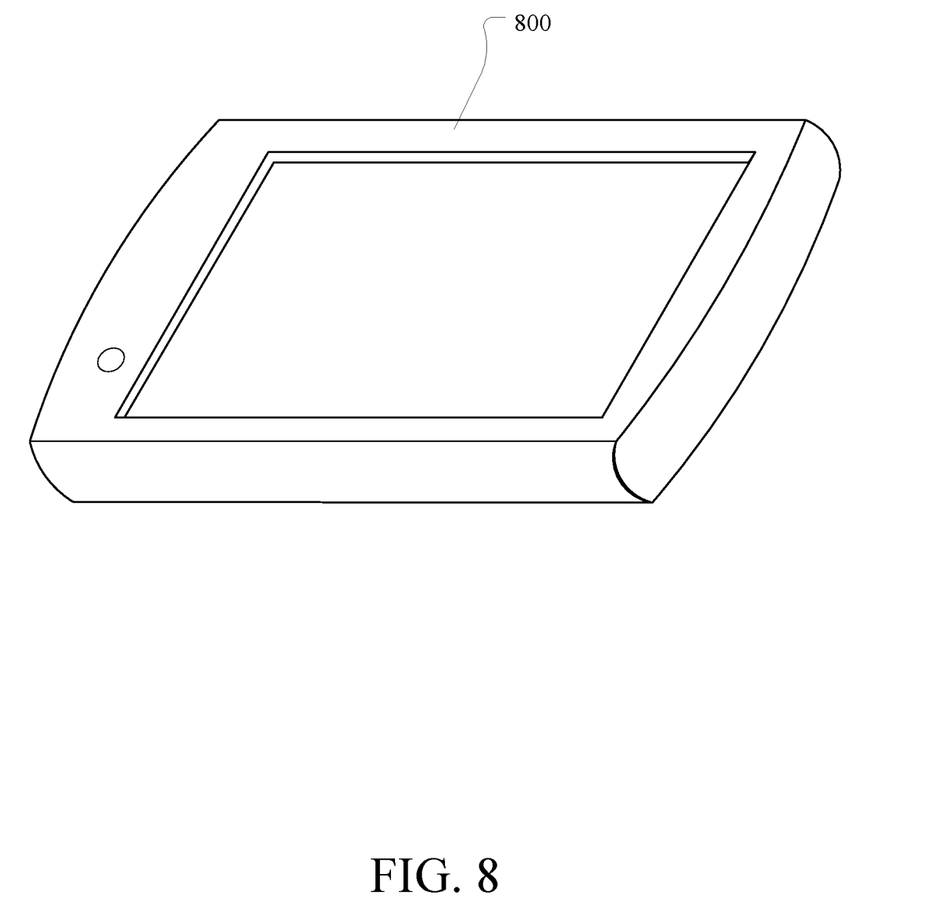
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processor; and
memory coupled to the processor, the memory comprising computer executable instructions that, when executed by the processor, performs operations comprising:
receiving, at a data storage device, a first data set comprising a primary key, a first secondary key, and a data item, wherein the primary key identifies a resource or an entity and the first secondary key is a first alias for the resource or the entity;
receiving, at the data storage device, a second data set comprising the primary key, a second secondary key, and the data item, wherein the second secondary key is a second alias for the resource or the entity;
associating the first secondary key to an internal identifier corresponding to the primary key to create a first key-value pair, wherein the first secondary key is a key portion of the first key-value pair and the internal identifier is a value portion of the first key-value pair;
associating the second secondary key to the internal identifier to create a second key-value pair; and
storing the first key-value pair and the second key-value pair in a first data storage structure of the data storage device.

2. The system of claim 1, the operations further comprising:
storing the internal identifier and the data item in a second data storage structure of the data storage device.

3. The system of claim 1, wherein each of the first secondary key and the second secondary key is:
a uniform resource locator (URL);
a uniform resource locator (URN); or
an identifier that is specific to an application or a service.

4. The system of claim 1, wherein the data item represents at least one of document content or one or more properties associated with a document.

5. The system of claim 1, the operations further comprising:
upon receiving the first data set and the second data set, identifying a commonality between the first data set and the second data set; and
combining the first data set and the second data set into a third data set that comprises the primary key, the first secondary key, the second secondary key, and the data item.

6. The system of claim 5, wherein the commonality includes at least one of:
the primary key;
the data item; or
a stated association between the first data set and the second data set.

7. The system of claim 1, the operations further comprising:
in response to receiving the first data set and the second data set, querying, using the primary key, the first data storage structure for the internal identifier; and
in response to determining the internal identifier is not found in the first data storage structure:
allocating the internal identifier to the primary key; and
associating the internal identifier with the primary key in the first data storage structure.

8. The system of claim 1, wherein associating the first secondary key to the internal identifier comprises:
querying the first data storage structure for the first secondary key; and
in response to determining that the first secondary key is not found in the first data storage structure, inserting the internal identifier into the first data storage structure.

9. The system of claim 1, wherein associating the first secondary key to the internal identifier comprises:
querying the first data storage structure for the first secondary key; and
in response to determining that the first secondary key is found in the first data storage structure, upserting the internal identifier into the first data storage structure such that the first secondary key is associated with the internal identifier.

10. The system of claim 9, wherein upserting the internal identifier comprises inserting the internal identifier into a row comprising at least one of the first secondary key or the primary key such that the internal identifier overwrites a previously stored internal identifier.

11. A method comprising:
receiving, at a data storage device, a first data set comprising a primary key, a first secondary key, and a data item, wherein the primary key identifies a resource or an entity and the first secondary key is a first alias for the resource or the entity;
receiving, at the data storage device, a second data set comprising the primary key, a second secondary key, and a portion of the data item, wherein the second secondary key is a second alias for the resource or the entity;
associating the first secondary key to an internal identifier corresponding to the primary key to create a first key-value pair, wherein the first secondary key is a key portion of the first key-value pair and the internal identifier is a value portion of the first key-value pair;
associating the second secondary key to the internal identifier to create a second key-value pair; and
storing the first key-value pair and the second key-value pair in a first data storage structure of the data storage device.

12. The method of claim 11, further comprising:
storing the internal identifier, the data item, and the portion of the data item in a second data storage structure of the data storage device.

13. The method of claim 12, wherein the first data storage structure is a first table in a key-value store and the second data storage structure is a second table in the key-value store.

14. The method of claim 11, wherein the primary key is a file name for a document and each of the first secondary key and the second secondary key is a uniform resource locator (URL) or a uniform resource locator (URN).

15. The method of claim 11, wherein the data item comprises at least two of:
text content;
image content; or
video content.

16. The method of claim 15, wherein the portion of the data item is an image portion of the image content or a video portion of the video content.

17. The method of claim 11, the method further comprising:
upon receiving the first data set and the second data set, identifying a commonality between the first data set and the second data set, wherein the commonality identifies that the portion of the data item is related to the data item.

18. The method of claim 17, the method further comprising:
based on the commonality, combining the first data set and the second data set into a third data set that comprises the primary key, the first secondary key, the second secondary key, the data item, and the portion of the data item.

19. The method of claim 11, wherein storing the first key-value pair and the second key-value pair in a first data storage structure comprises:
inserting the first key-value pair and the second key-value pair in a row associated with the primary key.

20. A system comprising:
a processor; and
memory coupled to the processor, the memory comprising computer executable instructions that, when executed by the processor, performs operations comprising:
receiving, at a data store, a first data set comprising a primary key, a first secondary key, and a first portion of a data item, wherein the primary key identifies a resource or an entity and the first secondary key is a first alias for the resource or the entity;
receiving, at the data store, a second data set comprising the primary key, a second secondary key, and a second portion of the data item, wherein the second secondary key is a second alias for the resource or the entity;
associating the first secondary key to an internal identifier corresponding to the primary key to create a first key-value pair, wherein the first secondary key is a key portion of the first key-value pair and the internal identifier is a value portion of the first key-value pair;
associating the second secondary key to the internal identifier to create a second key-value pair; and
storing the first key-value pair and the second key-value pair in a first data storage structure of the data store.

* * * * *